July 24, 1956 — H. E. STINEHELFER — 2,756,389
RESONANT CAVITY WAVEMETER
Filed Nov. 4, 1952 — 2 Sheets-Sheet 1

INVENTOR.
H. E. STINEHELFER
BY Edward R. Hyde Jr.
ATTORNEY

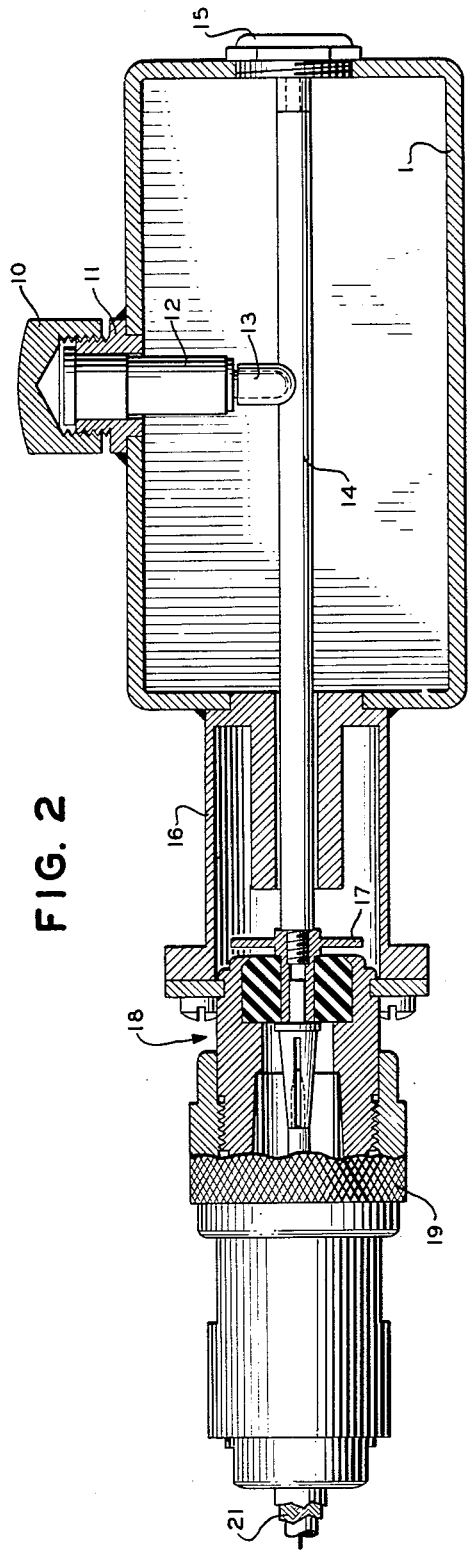
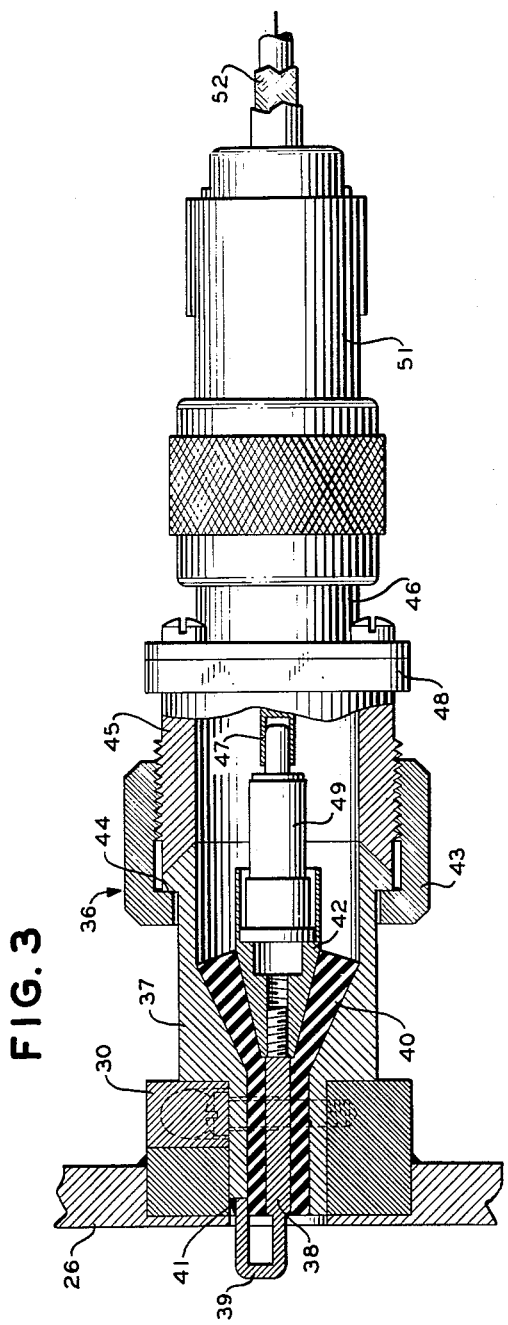

United States Patent Office 2,756,389
Patented July 24, 1956

2,756,389

RESONANT CAVITY WAVEMETER

Harold E. Stinehelfer, Woodside, N. Y., assignor to The Western Union Telegraph Company, New York, N. Y., a corporation of New York Application November 4, 1952, Serial No. 318,640

6 Claims. (Cl. 324—81)

This invention relates to high frequency measuring apparatus and primarily to a resonant cavity type wavemeter.

A principal object of this invention is to provide a wavemeter that operates as both an absorption and transmission type wavemeter.

Another object is to provide a wavemeter that will indicate whether sufficient test power is being supplied to the cavity resonator.

Another object is to provide a resonant cavity type wavemeter wherein an approximate adjustment to resonance is conveniently made followed by a precise adjustment.

Another object of this invention is to provide a resonant cavity type wavemeter that operates to give fast and accurate microwave frequency measurements.

A further object of this invention is to provide a method of measuring ultra-high frequency waves by first obtaining an approximate adjustment of a resonant cavity followed by a precise adjustment thereof.

The customary resonant cavity wavemeter is of the transmission type wherein microwave energy is transmitted through the cavity to a pickup device suitably coupled to a microammeter. The effective length of the cavity is adjusted until the microammeter gives a maximum reading thereby indicating resonance. In this type device, since tuning of the cavity is very sharp, the meter will read zero until the cavity is approximately tuned. This sharp tuning of the cavity, while it has the advantage of giving an accurate frequency measurement, presents certain disadvantages. For example, during adjustment when the meter reads zero, the operator would expect this to be due to the cavity being non-resonant to the impressed frequency when in fact the zero reading may be caused by failure or faulty operation of the power source. Further, indication at only one sharp point makes this point difficult to find and easy to pass when adjusting the cavity.

The desirability of first obtaining a rough adjustment of the cavity to approximate resonance can be readily appreciated. Applicant provides a novel device wherein the approximate resonant point is obtained by an indication when power is absorbed by the cavity.

A better understanding of the invention may be had from the following description taken in conjunction with the drawings wherein:

Fig. 2 is a section taken on the line 2—2 of Fig. 1 showing the absorption pick-up crystal; and Fig. 3 is a section taken on the line 3—3 of Fig. 1 showing the transmission crystal.

Figure 1:
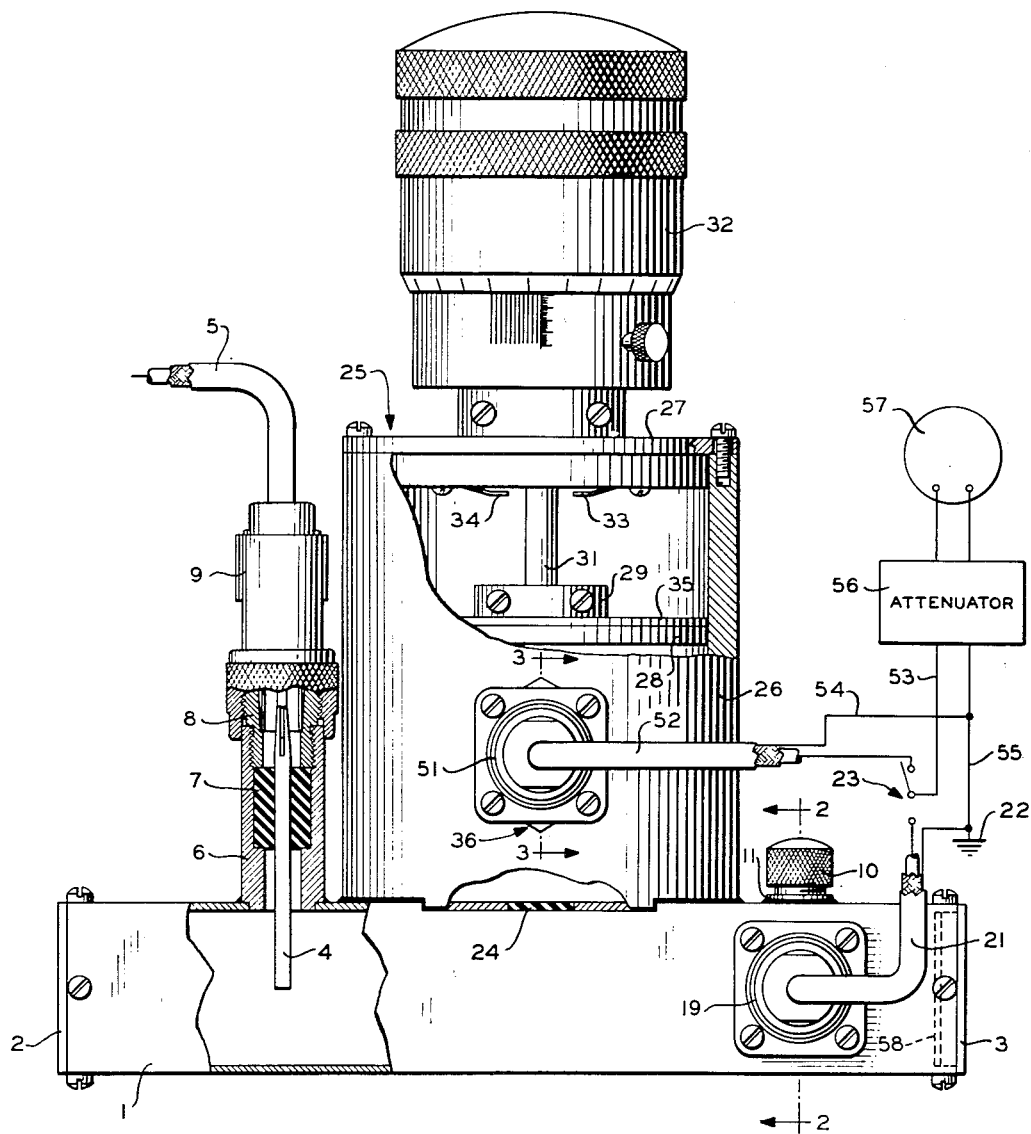
Fig. 1 is an elevational view partly broken away of a cavity resonator and waveguide connected to an indicating instrument shown diagrammatically.

Referring to the drawings, numeral 1 represents a rectangular waveguide closed at each end by end plates 2 and 3. Located at one end of the waveguide is a probe 4 adapted to be connected to coaxial cable 5 whereby microwaves of an unknown frequency are applied to the waveguide. This coaxial connecting assembly comprises a hollow body section 6 that fits into an opening in the top of waveguide 1 and is fastened thereto in any suitable manner such as soldering. Located within the body section 6 is an insulating bead 7 that holds probe 4 in coaxial alignment with the body section. A fitting 8 is secured to the upper end of body section 6 and is threaded to receive coaxial cable connector 9.

It may readily be seen that high frequency current received over coaxial cable 5 will result in electromagnetic energy waves being propagated through the waveguide. This wave energy will be detected at the opposite end of the waveguide by a crystal pick-up more clearly shown in Fig. 2.

An externally threaded crystal holder 11 fits into an opening in the top surface of waveguide 1 and may be conveniently soldered thereto. A crystal 12 which may be termed the absorption crystal is received by the holder and held in place by cap 10. The end of absorption crystal 12 projecting into the waveguide is engaged by a cup-like projection 13 of a crossbar 14 that extends transversely across the waveguide and is secured at one end to a mica capacitor 15 threaded to an opening in one side wall of the waveguide. An opening in the other side wall of the waveguide opposite the capacitor 15 receives a high frequency choke 16. Crossbar 14 passes through the hollow center of the choke and supports a by-pass capacitor plate 17 which terminates the choke. Connecting assembly 18 rigidly supports crossbar 14 and mates with connector 19 of coaxial cable 21. The outer conductor of coaxial cable 21 is grounded as at 22 and the inner conductor is connected to one terminal of a single pole double throw switch 23.

Choke 16 and condenser 17 are inserted at the crystal pick-up junction to prevent stray energy waves which may escape from the waveguide at this point from being conducted through cable 21. The distance between the probe 4 and the absorption crystal 12 is preferably one guide wavelength.

Located in the upper broad face of the waveguide intermediate the input probe and the transmitting crystal is an iris window 24 that directly couples the waveguide with a cavity resonator generally indicated at 25. The cavity resonator comprises a cylindrical member 26 conveniently soldered to the broad upper face of the waveguide and centered over the iris window 24. An end cap 27 is securely bolted to the top of the cylindrical cavity. The resonant chamber is rendered adjustable by means of plunger 28 that is secured by a split ring 29 to plunger rod 31 that passes through the end cap 27 and is adapted to be raised or lowered by a micrometer 32 of conventional construction. Leaf springs 33 and 34 are secured by bolts to the underside of end cap 27 to prevent the plunger, when being raised, from contacting the end plate with a sudden impact that might produce a maladjustment of the micrometer and plunger. A resistive washer 35 is cemented to the back of plunger 28 to absorb energy that might escape from the resonant chamber and cause spurious resonances.

Located in the wall of the cavity approximately intermediate the bottom thereof and the mean position of the plunger is an opening which receives a loop pick-up assembly 36 secured to the cylindrical member 26 by means of a slit ring 30, as clearly shown in Fig. 3. This assembly comprises a hollow body section 37 of conducting material such as brass, supporting a center conductor 38 integral with a loop 39. One end of the loop is soldered to the body section as shown at 41. A core 40 of dielectric material insulates the body 37 from the center conductor 38. The outer end of the center conductor is threaded to receive crystal cap holder 42. Clamping nut 43 engages the circular lip 44 of the body section and the threaded portion of clamping sleeve 45. A fitting 46 that holds crystal tip holder 47 is bolted to a flange 48 of clamping sleeve 45. It may readily be seen that crystal 49 may be conveniently replaced by loosening clamping nut 43 thereby separating the clamping sleeve 45 from the body section 37. Fitting 46 is threaded to receive connector 51 of coaxial cable 52. The inner conductor of the cable connects to a terminal of switch 23 and the outer conductor is grounded at 22 by means of conductors 54 and 55. The grounded outer conductors of coaxial cables 21 and 52 also connect to one input terminal of step attenuator 56, the other input terminal being connected to the center terminal of switch 23 by means of conductor 53. The output terminals of attenuator 56 are connected to microammeter 57. Attenuator 56 may be of any conventional design to present a constant load impedance and may be manually operable to change the sensitivity of the microammeter.

A sheet of resistive material 58 is cemented to the inner surface of waveguide end plate 3 to dampen natural resonant frequencies that might appear in the waveguide.

To determine an unknown frequency, the wavemeter is employed in the following manner. Switch 23 is initially closed in the lower position, as viewed in Fig. 1, to connect absorption crystal 12 to microammeter 57. A wave of unknown frequency is applied to input cable 5 thereby producing electromagnetic waves in the waveguide which will be propagated therethrough and detected by crystal 12. The microammeter will deflect in accordance with the amount of power reaching the crystal. A portion of the power transmitted through the waveguide will be absorbed by cavity 25 through the direct coupling of iris window 24. The amount of power thus absorbed by the cavity will be a maximum when the natural resonant frequency of the cavity is adjusted to the frequency of the electromagnetic waves. Adjusting the plunger 28 will therefore vary the amount of power so absorbed. It can rearily be seen that the greater the amount of power absorbed by the cavity, the less will be available to develop a potential across crystal 12. As the cavity plunger is adjusted to the resonance position, microammeter 57 will indicate a minimum reading. Crystal 12 is termed the absorption crystal because it is employed to indicate the absorption of power by the cavity. With the absorption crystal connected in the metering circuit, the operator can quickly determine when there is sufficient power in the waveguide to excite the cavity and also set the cavity plunger to approximate resonance. However, since this absorption tuning of the cavity is not sharp, further adjustment of the plunger is made with loop 39 and crystal 49 connected in the metering circuit. Pickup loop 39 is energized by the energy waves transmitted through the cavity 25. Crystal 49, in series with loop 39 may therefore be termed the transmission crystal. With the latter connected in the metering circuit, a fine adjustment of the plunger to resonant condition can be effected. The microammeter will indicate maximum deflection at resonance with switch 23 closed in the upper position, as viewed in Fig. 1, to connect transmission crystal 49 to the microammeter. The micrometer head is then read and the reading is interpolated on calibration curves to obtain the equivalent frequency in megacycles per second.

While a specific embodiment of the invention has been disclosed, it is understood that various changes and modifications can be made without departing from the scope of the invention as defined in the appended claims.

What is claimed is:

1. In a resonant cavity wavemeter, an elongated hollow waveguide closed at each end, means to energize said waveguide located at one end thereof, means located at the other end of said waveguide to detect energy waves therein, a cavity resonator coupled to the waveguide at a point between said energizing means and said detecting means, means to vary the effective length of the cavity, second detecting means located within said cavity to detect the energy waves transmitted therethrough and indicating means adapted to be selectively coupled to the first said detecting means and to the said second detecting means.

2. In a resonant cavity wavemeter, an elongated hollow waveguide closed at each end, energizing means located within said waveguide, first power detecting means located in said waveguide a distance of substantially one guide wavelength of the applied waves from said energizing means, a cavity resonator coupled to said waveguide at a point between said first detecting means and said energizing means, means to vary the effective length of the cavity, second power detecting means located within said cavity to detect the energy waves transmitted therethrough and indicating means responsive to each of said detecting means.

3. In a resonant cavity wavemeter, an elongated hollow waveguide, energizing means located within said waveguide to thereby initiate energy waves therein, first detecting means in said waveguide, a cavity resonator coupled to said waveguide at a point substantially equidistant from said energizing means and said first detecting means, means to vary the effective length of said cavity resonator, second detecting means located within said cavity resonator to detect the energy waves transmitted therethrough and means responsive to said first detecting means and said second detecting means.

4. In a resonant cavity wavemeter, an elongated hollow waveguide, energizing means located within said waveguide to initiate energy waves therein, first detecting means located in said waveguide a distance of substantially one guide wavelength of the applied waves from said energizing means, a cavity resonator coupled to said waveguide substantially equidistant from said energizing means and said first detecting means, means to vary the effective length of said cavity resonator, second detecting means located within said cavity resonator to detect the energy waves transmitted therethrough and means responsive to said first detecting means and said second detecting means.

5. In a resonant cavity wavemeter, an elongated hollow waveguide, energizing means located within said waveguide to initiate energy waves therein, first detecting means located in said waveguide a distance of substantially one guide wavelenth of the applied waves from said energizing means, a cylindrical cavity resonator coupled at one end to said waveguide intermediate said energizing means and said first detecting means, a movable plunger mounted at the other end of said cavity resonator to vary the effective length of said cavity resonator, second detecting means located within said cavity resonator, and indicating means responsive to said first detecting means and said second detecting means.

6. In a resonant cavity wavemeter, an elongated hollow waveguide closed at each end, means to energize said waveguide located at one end thereof, first detecting means located at the other end of said waveguide to detect energy waves therein, a cavity resonator coupled to the waveguide at a point between said energizing means and said first detecting means, means to vary the effective length of the cavity, second detecting means located within said cavity to detect the energy waves transmitted therethrough and means connected to indicate the energy detected by said first and second detecting means.

References Cited in the file of this patent

UNITED STATES PATENTS

| | | |
|---|---|---|
| 2,186,184 | Tubbs | Jan. 9, 1940 |
| 2,605,459 | Cook | July 29, 1952 |
| 2,642,494 | Zaslavsky et al. | June 16, 1953 |